(12) United States Patent
Miyasaka

(10) Patent No.: US 7,126,350 B2
(45) Date of Patent: *Oct. 24, 2006

(54) ELECTROSTATIC CAPACITANCE DETECTION DEVICE

(75) Inventor: Mitsutoshi Miyasaka, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/924,993

(22) Filed: Aug. 25, 2004

(65) Prior Publication Data

US 2005/0077911 A1 Apr. 14, 2005

(30) Foreign Application Priority Data

Aug. 29, 2003 (JP) ............... 2003-209667

(51) Int. Cl.
G01R 29/12 (2006.01)
G01R 27/26 (2006.01)

(52) U.S. Cl. .................... 324/662; 324/457

(58) Field of Classification Search ........... 324/662, 324/671
See application file for complete search history.

(56) References Cited

U.S. PATENT DOCUMENTS

| | | | | |
|---|---|---|---|---|
| 5,194,862 | A * | 3/1993 | Edwards | 341/20 |
| 6,320,394 | B1 * | 11/2001 | Tartagni | 324/671 |
| 6,448,790 | B1 * | 9/2002 | Imai | 324/661 |
| 6,657,269 | B1 * | 12/2003 | Migliorato et al. | 257/414 |
| 6,882,164 | B1 * | 4/2005 | Yano et al. | 324/663 |
| 7,078,917 | B1 * | 7/2006 | Yoshida et al. | 324/662 |
| 2002/0117694 | A1 * | 8/2002 | Migliorato et al. | 257/253 |
| 2005/0078856 | A1 * | 4/2005 | Miyasaka et al. | 382/124 |

FOREIGN PATENT DOCUMENTS

| | | |
|---|---|---|
| JP | A 11-118415 | 4/1999 |
| JP | A 11-312811 | 11/1999 |
| JP | A 2000-279397 | 10/2000 |
| JP | A 2000-346608 | 12/2000 |
| JP | A 2001-56204 | 2/2001 |
| JP | A 2001-133213 | 5/2001 |
| JP | A 2003-004697 | 1/2003 |
| JP | A 2003-172602 | 6/2003 |
| JP | A 2003-254706 | 9/2003 |
| JP | A 2004-89675 | 3/2004 |

* cited by examiner

*Primary Examiner*—Hezron Williams
*Assistant Examiner*—Tamiko Bellamy
(74) *Attorney, Agent, or Firm*—Oliff & Berridge, PLC

(57) ABSTRACT

Aspects of the invention can provide an electrostatic capacitance detection device having M number of row lines and N number of column lines arranged in a matrix of M rows and N columns, and an electrostatic capacitance detection element formed at the intersection thereof. The electrostatic capacitance detection element can include a signal detection element, a signal amplifying element and a column selection element and a row selection element. The signal detection element can include a capacitance detecting electrode, a capacitance detecting dielectric layer, and a reference capacitor. One of a pair of electrodes in the reference capacitor is coupled to the row line. Accordingly, the invention can achieve a superior electrostatic capacitance detection device.

21 Claims, 5 Drawing Sheets

$$V_{GT} = \frac{kC_T + C_R}{C_D + C_T + C_R} \cdot V_{dd}$$

Since $0 < k \leq 1$, $kC_T + C_R \leq C_T + C_R$

If $C_D \gg C_T + C_R$ ...Condition 1, $C_D \gg kC_T + C_R$,

Then $V_{GT} \approx 0$

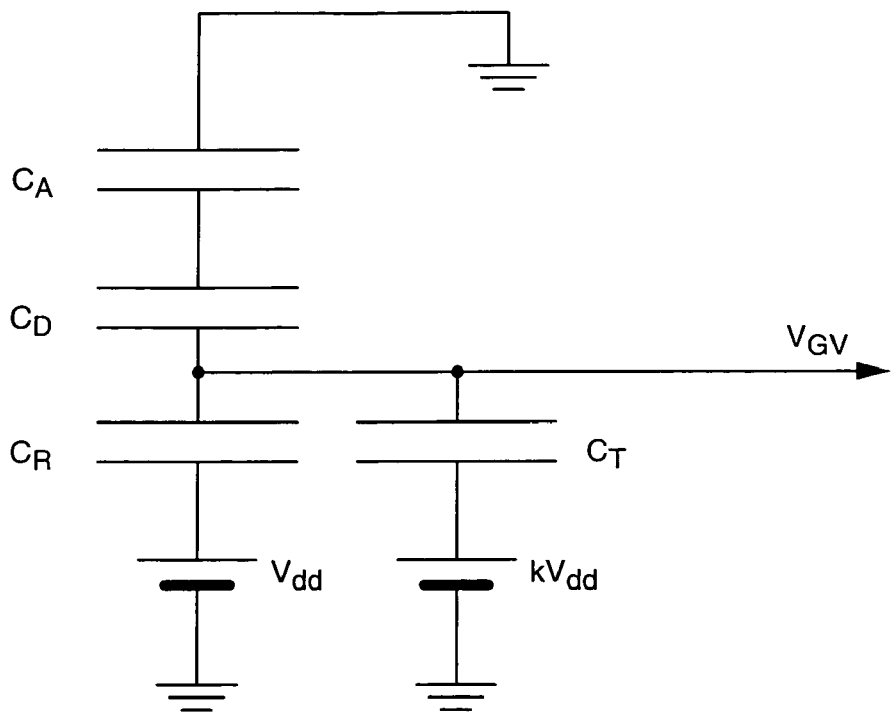

$$V_{GV} = \frac{kC_T + C_R}{\frac{C_A C_D}{C_A + C_D} + C_T + C_R} \cdot V_{dd}$$

$$= \frac{V_{dd}}{\frac{C_T + C_R}{kC_T + C_R} + \frac{1}{(kC_T + C_R)/C_D + (kC_T + C_R)/C_A}}$$

Because of the Condition 1

$$C_D \gg C_T + C_R \geq kC_T + C_R$$

$$V_{GV} \approx \frac{V_{dd}}{\frac{C_T + C_R}{kC_T + C_R} + \frac{C_A}{kC_T + C_R}}$$

If $C_R \gg C_A$, ... Condition 2 then $C_R + kC_T \gg C_A$ $$\therefore V_{GV} \approx \frac{kC_T + C_R}{C_T + C_R} \cdot V_{dd}$$

If $C_R \gg C_T$, ... Condition 3 then $V_{GV} \approx V_{dd}$

FIG. 5

ELECTROSTATIC CAPACITANCE DETECTION DEVICE

BACKGROUND OF THE INVENTION

1. Field of Invention

Aspects of the invention relate to an electrostatic capacitance detection device that reads the surface contours of a fingerprint or other target object having extremely small ridges and valleys, by detecting electrostatic capacitance, which changes according to the distance from the surface of the target object.

2. Description of Related Art

As described in, for example, Japanese Unexamined Patent Publication Application No. Hei 11-118415, No. 2000-346608, No. 2001-56204, No. 2001-133213, and so forth, in related electrostatic capacitance detection devices that are used in fingerprint sensors and so forth, a sensor electrode and a dielectric layer deposited on the sensor electrode are formed on a single-crystal silicon wafer. The principle of operation of a related electrostatic capacitance detection device is shown in FIG. 1. One of a pair of electrodes in a capacitor is a sensor electrode, the other is grounded to a human. Further, a dielectric layer is formed on the uppermost surface of the electrostatic capacitance detection device. The capacitance $C_F$ of this capacitor changes according to the ridges and valleys in a fingerprint contacting the surface of the dielectric layer. On the other hand, the semiconductor substrate is equipped with a capacitor that forms an electrostatic capacitance $C_S$. These two capacitors are connected in series, and a predetermined voltage is applied. The application of a voltage causes a charge Q corresponding to the ridges and valleys in a fingerprint to be formed between the two capacitors. This charge Q is sensed using ordinary semiconductor technology and the surface contours of the target object are read.

SUMMARY OF THE INVENTION

However, the related electrostatic capacitance detection devices are formed on a single-crystal silicon wafer. Hence, they are fragile and subject to breaking when too much finger pressure is applied when they are used as a fingerprint sensor.

In addition, fingerprint sensors, because of the application, need to be approximately 20 mm×20 mm in size. The majority of the area of the electrostatic capacitance detection device is occupied by the sensor electrodes. The sensor electrodes are, of course, formed on a single-crystal silicon wafer, yet the majority of the single-crystal silicon wafer (the lower sensor electrode), the creation of which requires enormous energy and labor, serves as nothing more than a supporting member. In other words, the electrostatic capacitance detection devices of the prior art are not only expensive, they are formed at huge waste and expense.

Moreover, it has been strongly suggested that personal identification functions ought to be provided on cards, such as credit cards and bank cards, to increase card security. However, electrostatic capacitance detection devices of the prior art that are made on a single-crystal wafer lack flexibility and, therefore, cannot be formed on a plastic substrate.

Taking the aforesaid situation into account, the invention is designed to provide a superior electrostatic capacitance detection device that operates stably, can reduce the expenditure of unnecessary energy and labor during manufacture, and can be made on a substrate other than a single-crystal silicon wafer.

In this invention, an electrostatic capacitance detection device reading the surface contours of a target object by detecting electrostatic capacitance is formed on a glass substrate or the like using a thin-film semiconductor device. The electrostatic capacitance detection device can include a plurality of output lines and a plurality of power supply lines, M number of row lines, and N number of column lines arranged in a matrix of M rows and N columns, and M×N numbers of the electrostatic capacitance detection elements, each of which is formed at the intersection between a row line and a column line. The each electrostatic capacitance detection element includes a signal detection element, a signal amplifying element, a column selection element and a row selection element. The signal detection element includes a capacitance detecting electrode, a capacitance detecting dielectric layer and a reference capacitor. The reference capacitor can include a reference capacitor first electrode, a reference capacitor dielectric layer and a reference capacitor second electrode. The signal amplifying element, the column selection element and the row selection element are coupled in series and located between the output line and the power supply line. The reference capacitor first electrode is electrically coupled to the row line. In addition, the capacitance detecting electrode is electrically coupled to the reference capacitor second electrode.

Further, the signal amplifying element includes an MIS thin-film semiconductor device for signal amplification, including a gate electrode, a gate insulator and a semiconductor layer, and the gate electrode of the signal amplifying element is electrically coupled to the capacitance detecting electrode and the reference capacitor second electrode. The column selection element includes an MIS thin-film semiconductor device for column selection, including the gate electrode, the gate insulator, and the semiconductor layer, and the gate electrode of the column selection element is electrically coupled to the column line. The row selection element includes an MIS thin-film semiconductor device for row selection, including the gate electrode, the gate insulator, and the semiconductor layer, and the gate electrode of the row selection element is electrically coupled to the row line. The MIS thin-film semiconductor device for signal amplification and the MIS thin-film semiconductor device for row selection, both of which are in the electrostatic capacitance detection element, are the same conductivity type thin-film semiconductor device.

The power supply line and the output line are adaptively arranged in a matrix of M rows and N columns. The power supply line is always connected to a negative power supply or a positive power supply. A measuring instrument including an ammeter and a voltmeter is connected at an end of the output line being outside of the matrix of M rows and N columns. When the power supply line is connected to the negative power supply, the output line is connected to the positive power supply via the measuring instrument. Conversely, when the power supply line is connected to the positive power supply, the output line is connected to the negative power supply via the instrument. In the invention, if the thin-film semiconductor device included in the electrostatic capacitance detection element is an N-type, the negative power supply means the ground potential (zero volt) and the positive power supply means a plus potential (for example, +2.5 V, +3.3 V or the like). On the other hand, if the thin-film semiconductor device included in the electrostatic capacitance detection element is a P-type, the positive power supply means the ground potential (zero volt) and the negative power supply means a minus potential (for example, minus 2.5 V, minus 3.3 V or the like). If the column selection element is an N-type thin film semiconductor device, the column line is kept at a negative power supply potential (ground potential) during an unselected period, and a positive power supply potential (plus potential) is applied thereto during a selected period. If the row selection element is the N-type thin film semiconductor device, the row line is kept at the negative power supply potential (ground potential) during the unselected period, and the positive power supply potential (plus potential) is applied thereto during the selected period. If the column selection element is a P-type thin film semiconductor device, the column line is kept at the positive power supply potential (ground potential) during the unselected period, and the negative power supply potential (minus potential) is applied thereto during the selected period. Also, if the row selection element is the P-type thin film semiconductor device, the row line is kept at the positive power supply potential (ground potential) during the unselected period, and the negative power supply potential (minus potential) is applied thereto during the selected period.

The reference capacitor dielectric layer and the gate insulator of the MIS thin-film semiconductor device for signal amplification are formed with a same material. These layers may be formed on a same layer. The reference capacitor first electrode and a drain region of the MIS thin-film semiconductor device for signal amplification are formed with a same material. The reference capacitor first electrode and a drain region of the MIS thin-film semiconductor device for signal amplification are formed on a same layer. The reference capacitor second electrode and the gate electrode of the MIS thin-film semiconductor device for signal amplification are formed with a same material. These layers may be formed on a same layer.

An element capacitance $C_D$ is sufficiently larger than the sum of a reference capacitor capacitance $C_R$ and a transistor capacitance $C_T$, namely $C_R+C_T$, when the reference capacitor capacitance $C_R$ and the transistor capacitance $C_T$ are defined by the equation:

$$C_R = \epsilon_0 \cdot \epsilon_R \cdot S_R / t_R$$

$$C_T = \epsilon_0 \cdot \epsilon_{ox} \cdot S_T / t_{ox}$$

where $S_R$ (μm$^2$) is the area of the reference capacitor electrode, $t_R$ (μm) is the thickness of the reference capacitor dielectric layer, $\epsilon_R$ is the relative dielectric constant of the reference capacitor dielectric layer, $S_T$ (μm$^2$) is the area of the gate electrode of the MIS thin-film semiconductor device, $t_{ox}$ (μm) is the thickness of the gate insulator, $\epsilon_{ox}$ is the relative dielectric constant of the gate insulator and $\epsilon_0$ is the permittivity in vacuum, and when the element capacitance $C_D$ of the signal detection element is defined by the equation:

$$C_D = \epsilon_0 \cdot \epsilon_D \cdot S_D / t_D$$

where $S_D$ (μm$^2$) is the area of the capacitance detecting electrode, $t_D$ (μm) is the thickness of the capacitance detecting dielectric layer, $\epsilon_D$ is the relative dielectric constant of the capacitance detecting dielectric layer and $\epsilon_0$ is the permittivity in vacuum. It is ideal that the reference capacitor capacitance $C_R$ is sufficiently larger than the transistor capacitance $C_T$. Therefore, the element capacitance $C_D$ is sufficiently larger than the reference capacitor capacitance $C_R$. The capacitance detecting dielectric layer is located on the uppermost surface of the capacitance detection device.

If the target object is not in contact with but is separated from the capacitance detecting dielectric layer by a target object distance $t_A$, the reference capacitor capacitance $C_R$ is sufficiently larger than a target object capacitance $C_A$, when the target object capacitance $C_A$ is defined by the equation:

$$C_A = \epsilon_0 \cdot \epsilon_A \cdot S_D / t_A$$

where $\epsilon_0$ is the permittivity in vacuum, $\epsilon_A$ is the relative dielectric constant of air, $S_D$ is the area of the capacitance detecting electrode. Here, also it is ideal that the reference capacitor capacitance $C_R$ is sufficiently larger than the transistor capacitance $C_T$.

The capacitance detecting dielectric layer is located on the uppermost surface of the electrostatic capacitance detection device, and the element capacitance $C_D$ is sufficiently larger than the sum of the reference capacitor capacitance $C_R$ and the transistor capacitance $C_T$, namely $C_R+C_T$, when the reference capacitor capacitance $C_R$ and the transistor capacitance $C_T$ are defined by the equation:

$$C_R = \epsilon_0 \cdot \epsilon_R \cdot S_R / t_R$$

$$C_T = \epsilon_0 \cdot \epsilon_{ox} \cdot S_T / t_{ox}$$

where $S_R$ (μm$^2$) is the area of the reference capacitor electrode, $t_R$ (μm) is the thickness of the reference capacitor dielectric layer, $\epsilon_R$ is the relative dielectric constant of the reference capacitor dielectric layer, $S_T$ (μm$^2$) is the area of the gate electrode of the MIS thin-film semiconductor device, $t_{ox}$ (μm) is the thickness of the gate insulator, $\epsilon_{ox}$ is the relative dielectric constant of the gate insulator and $\epsilon_0$ is the permittivity in vacuum and when the element capacitance $C_D$ of the signal detection element is defined by the equation:

$$C_D = \epsilon_0 \cdot \epsilon_D \cdot S_D / t_D$$

where $S_D$ (μm$^2$) is the area of the capacitance detecting electrode, $t_D$ (μm) is the thickness of the capacitance detecting dielectric layer, $\epsilon_D$ is the relative dielectric constant of the capacitance detecting dielectric layer and $\epsilon_0$ is the permittivity in vacuum, and the reference capacitor capacitance $C_R$ is sufficiently larger than the target object capacitance $C_A$, when the target object capacitance $C_A$ is defined by the equation:

$$C_A = \epsilon_0 \cdot \epsilon_A \cdot S_D / t_A$$

where $\epsilon_0$ is the permittivity in vacuum, $\epsilon_A$ is the relative dielectric constant of air, $S_D$ is the area of the capacitance detecting electrode. Here, also it is ideal that the reference capacitor capacitance $C_R$ is sufficiently larger than the transistor capacitance $C_T$. Therefore, the element capacitance $C_D$ is sufficiently larger than the reference capacitor capacitance $C_R$, and the reference capacitor capacitance $C_R$ is sufficiently larger than the target object capacitance $C_A$.

BRIEF DESCRIPTION OF THE DRAWINGS

The invention will be described with reference to the accompanying drawings, wherein like numerals reference like elements, and wherein:

FIG. 5 is a diagram illustrating the principle of the invention; and

DETAILED DESCRIPTION OF PREFERRED EMBODIMENTS

The invention can provide an electrostatic capacitance detection device that reads the surface contours of a target object by detecting electrostatic capacitance, which changes according to the distance from a target object. The electrostatic capacitance detection device is formed as an MIS thin-film semiconductor device comprising a metal-insulator-semiconductor layer. Since they are ordinarily fabricated on inexpensive glass substrates, thin-film semiconductor devices are generally known for their usefulness in inexpensively fabricating semiconductor integrated circuits that require a large area, specifically devices such as liquid crystal display devices. Therefore, fabricating thin-film semiconductor devices for use as an electrostatic capacitance detection device in a fingerprint sensor, for example, obviates the need to use an expensive substrate, such as a single-crystal silicon wafer, whose production consumes tremendous energy. Instead, the device can be fabricated inexpensively on glass without wasting precious global resources. In addition, a semiconductor integrated circuit including a thin-film semiconductor device can be fabricated on a plastic substrate by applying the transfer technology so-called SUFTLA (Surface Free Technology by Laser Ablation/Annealing). See, for example, Japanese Unexamined Patent Publication Application No. Hei 11-312811 and by S. Utsunomiya et. al in *Society for Information Display*, p. 916 (2000). Therefore, such electrostatic capacitance detection devices do not have to be produced on a single-crystal silicon wafer but can also be formed on a plastic substrate.

Figure 1:
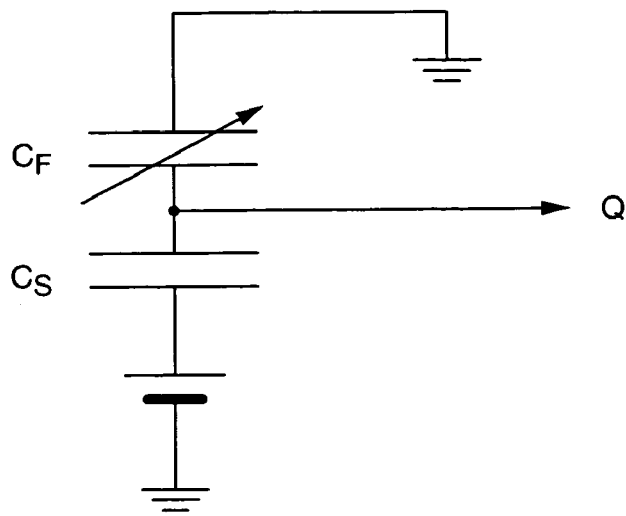
FIG. 1 is a diagram illustrating the principle of operation in related technology.

As shown in FIG. 1, using a thin-film semiconductor device to produce an electrostatic capacitance detection device can be impossible with current thin-film semiconductor device technology. The charge Q that is induced between two capacitors connected in series is extremely small. The charge Q can be read if single-crystal silicon LSI technology, which enables high-accuracy detecting, is used. However, the charge Q cannot be accurately read with a thin-film semiconductor device. This is because the transistor characteristics in a thin-film semiconductor are not as good as the transistor characteristics obtained with single-crystal silicon LSI technology, and, moreover, because there is a large degree of deviation in characteristics between thin-film semiconductor devices. The electrostatic capacitance detection device of the invention can include a plurality of output lines and a plurality of power supply lines, M number (M is an integer of one or more) of row lines and N number (N is an integer of one or more) of column lines arranged in a matrix of M rows and N columns, and M×N number of the electrostatic capacitance detection elements, each of which is formed at the intersection between a row line and a column line. Each of the electrostatic capacitance detection devices can include a signal detection element, a signal amplifying element, a row selection element, and a column selection element. The signal detection element can include a capacitance detecting electrode, a capacitance detecting dielectric layer, and a reference capacitor. The reference capacitor can include a reference capacitor first electrode, a reference capacitor dielectric layer, and a reference capacitor second electrode.

If the target object, such as a fingerprint, contacts or comes close to the capacitance detecting dielectric layer, a potential level $V_G$ is produced in the capacitance detecting electrode in response to an electrostatic capacitance to the target object. In this invention, the potential level $V_G$ can be amplified by the signal amplifying element formed within each the electrostatic capacitance detection elements and is converted to an amplified current or voltage. Specifically, the signal amplifying element is composed of the MIS thin-film semiconductor device for signal amplification including a gate electrode, a gate insulator and a semiconductor layer. One of a pair of electrodes in the reference capacitor is connected to the row line, and the other electrode is connected to the capacitance detecting electrode and the gate electrode of the MIS thin-film semiconductor device for signal amplification. For example, if the reference capacitor first electrode is electrically connected to the column line, the reference capacitor second electrode is electrically connected to the capacitance detecting electrode, and further the capacitance detecting electrode and the reference capacitor second electrode are electrically connected to the gate electrode of the MIS thin-film semiconductor device for signal amplification.

In contrast, if the reference capacitor second electrode is electrically connected to the row line, the reference capacitor first electrode is electrically connected to the capacitance detecting electrode, and further the capacitance detecting electrode and the reference capacitor first electrode are electrically connected to the gate electrode of the MIS thin-film semiconductor device for signal amplification.

Figure 2:
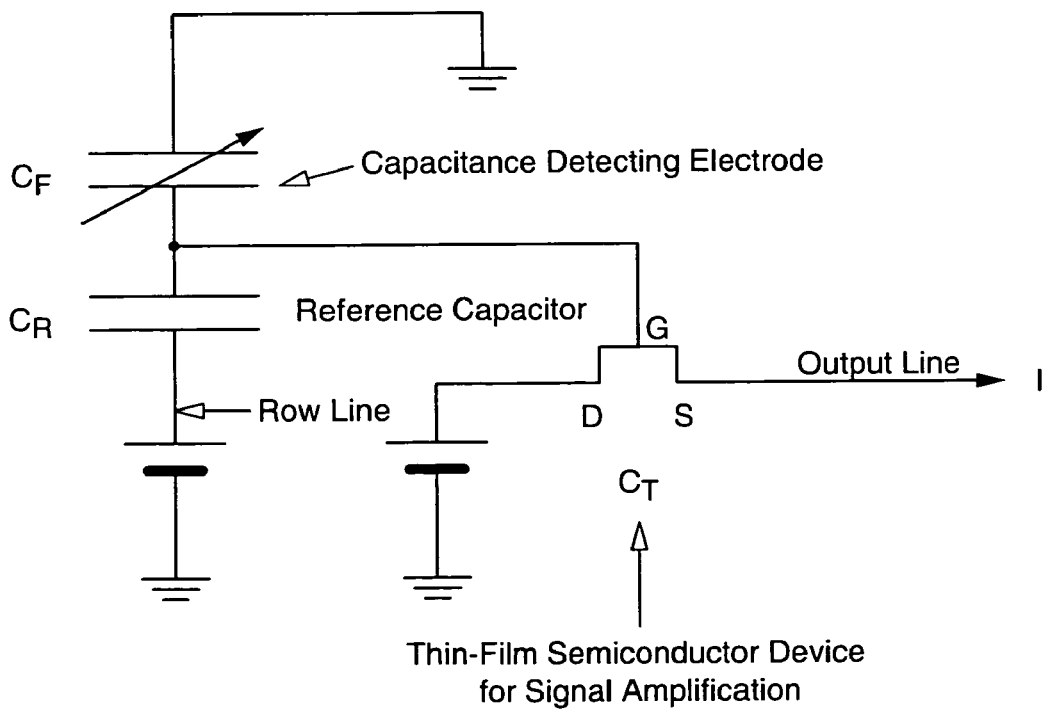
FIG. 2 is a diagram illustrating the principle of operation in the invention.

The operating principle of the invention configured as above-mentioned will be described with reference to FIG. 2. The potential $V_G$ induced between an electric capacitance $C_F$, which changes according to the surface contours of a target object, and a combined capacitance $C_R+C_T$, which is a sum of an electrostatic capacitance $C_R$ of the reference capacitor and a transistor capacitance $C_T$ of the MIS thin-film semiconductor device for signal amplification, is connected to the gate electrode of the MIS thin-film semiconductor device for signal amplification (G in FIG. 2) so as to change a gate potential of the semiconductor device. Thus, if a predetermined voltage is applied to the drain region (D in FIG. 2) of this thin-film semiconductor device, the current $I_{ds}$ that flows between the source and the drain of the thin-film semiconductor device is markedly modulated corresponding to the induced potential $V_G$. While the charge Q is produced in the gate electrode or the like according to the potential $V_G$, the induced charge Q does not flow elsewhere but is retained so as to maintain the source drain current $I_{ds}$ constant. Hence, the measurement of the current $I_{ds}$ is also facilitated by raising drain voltage or by extending the length of measuring time and so forth. Consequently, the surface contours of a target object can be measured with sufficient accuracy even if a thin-film semiconductor device is used. A signal (the source-drain current or the voltage corresponding to it), which the electrostatic capacitance information of the target object is amplified, is read by a measuring instrument via the output line. In order to measure the electrostatic capacitance of the target object, the source-drain current in the signal amplifying element or the voltage $V_{ds}$ produced in the signal amplifying element corresponding to the source-drain current $I_{ds}$ may be measured.

Next, an exemplary circuit arrangement of the electrostatic capacitance detection element that embodies this invention will be explained with reference to FIG. 3. As above-mentioned, the electrostatic capacitance detection element essentially possesses the signal amplifying element and the signal detection element. The signal detection element includes the capacitance detecting electrode, the capacitance detecting dielectric layer and the reference capacitor. The reference capacitor includes the reference capacitor first electrode, the reference capacitor dielectric layer and the reference capacitor second electrode. The signal amplifying element is composed of the MIS thin-film semiconductor device for signal amplification including the gate electrode, the gate insulator and the semiconductor layer.

In order to prevent the electrostatic detection element from an information interference therebetween and to detect the surface contours of the target object at high speed and accurately, in this invention, the each electrostatic capacitance detection element includes the column selection element and the row selection element other than above-mentioned. The column selection element is composed of a MIS thin-film semiconductor device for column selection including the gate electrode, the gate insulator and the semiconductor layer. Likewise, the row selection element is composed of a MIS thin-film semiconductor device for row selection including the gate electrode, the gate insulator and the semiconductor layer. Three types of thin film semiconductor device that form the signal amplifying element, the column selection element and the row selection element are the same conductivity type. In addition, the signal amplifying element, the column selection element and the row selection element are arranged in series connection between the power supply line and the output line.

For an example, the drain electrode of a N-type MIS thin-film semiconductor device for row selection is electrically connected to the output line, the source electrode of the N-type MIS thin-film semiconductor device for row selection and the drain electrode of a N-type MIS thin-film semiconductor device for column selection are connected, and further the source electrode of the N-type MIS thin-film semiconductor device for column selection and the drain electrode of the N-type MIS thin-film semiconductor device for signal amplification are connected, and the source electrode of the N-type MIS thin-film semiconductor device for signal amplification is electrically connected to the power supply line. Being electrically connected means that it becomes a condition capable of an electrical conduction via a switching element or the like. Of course, the source electrode of the MIS thin-film semiconductor device for signal amplification may be connected directly to the power supply line or the drain electrode of the MIS thin-film semiconductor device for row selection may be connected directly to the output line.

In addition, since the source electrode and the drain electrode of the transistor are symmetric in construction, the source electrode and the drain electrode may be interchangeable. In other words, the word of "source electrode" and "drain electrode" described in the above-mentioned example may be interchangeable. However, if they are aimed at perfection in physical point of view, the source electrode is defined one having a lower potential in a N-type transistor or one having a higher potential in a P-type transistor. In this example, a high potential ($V_{dd}$) is applied to the output line via the measuring instrument, and a negative power supply is connected to the power supply line. Since N-type transistors are used for the signal amplifying, the column selection and the row selection elements in the example, the drain electrodes of the signal amplifying, the column selection and the row selection elements are positioned at the output line side, and the source electrodes of those are positioned at the power supply line side. Further, a positional relationship among the column selection element, the signal amplifying element and the row selection element may be replaced in diverse ways. For example, the signal amplifying element may be placed at the closest to the output line and the row selection element may be placed at the closest to the power supply line.

In the invention, the reference capacitor first electrode can be electrically connected to the row line and the other electrode (the second electrode) is connected to the capacitance detecting electrode and the gate electrode of the MIS thin-film semiconductor device for signal amplification. In the current invention, since the high potential is supplied onto a row line while it is selected, and since the reference capacitor is directly connected to the row line, the reference capacitor first electrode can be high in voltage without a voltage drop, so as to apply a gate potential, which corresponds to the capacitance of the target object, on the gate electrode of the signal amplifying element. Here, the high potential can mean a plus potential if the row selection and signal amplifying elements are the N-type semiconductor devices. Conversely, the high potential mean a minus potential if those elements are the P-type semiconductor devices. Thus, an electric conductivity between the source and the drain of the MIS thin-film semiconductor device for signal amplification is changed. Detecting this can obtain the surface contours information of the target object, such as the fingerprint information.

The column selection element and the row selection element are provided in order to prevent the information interference among the electrostatic capacitance detection elements. The column selection element is composed of the MIS thin-film semiconductor for column selection including the gate electrode, the gate insulator and the semiconductor layer. The gate electrode of the MIS thin-film semiconductor for column selection is electrically connected to the column line. The row selection element is composed of the MIS thin-film semiconductor for row selection including the gate electrode, the gate insulator and the semiconductor layer. The gate electrode of the MIS thin-film semiconductor for row selection is electrically connected to the row line. A row selection signal applied on the row line causes the row selection element to be an ON state. A column selection signal applied on the column line causes the column selection element to be the ON state.

Figure 3:
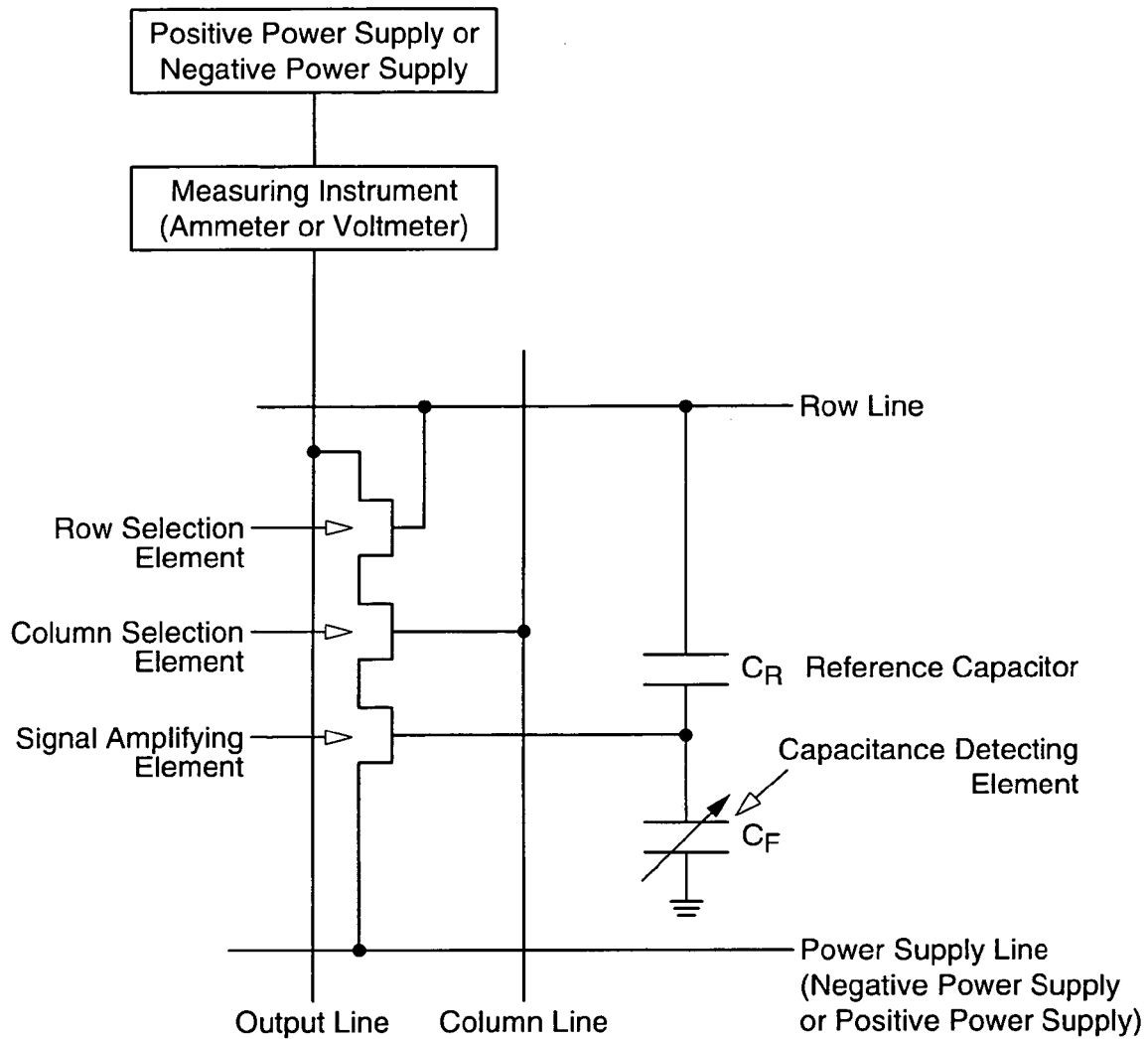
FIG. 3 is a diagram illustrating the circuit configuration of the electrostatic capacitance detection element of the invention.

In FIG. 3, the N-type semiconductor device is used for the row selection element. The gate electrode of the N-type semiconductor device is connected to the row line and the drain electrode of that is connected to the output line. Accordingly, only the time when the selection signal having the high potential ($V_{dd}$: positive power supply potential) is input to the row line, the electric conductivity of the row selection element increases so as to be a switched-on state.

The source electrode of the N-type thin-film semiconductor device for row selection is connected to the drain electrode of the N-type thin-film semiconductor device for column selection. The gate electrode of the N-type thin-film semiconductor device for column selection is connected to the column line. The column line is the low potential ($V_{ss}$: minus power supply potential) during the unselected period. The high potential ($V_{dd}$: positive power supply potential) is applied when the column line enters the selected state. Accordingly, only the time when the column line is selected, the electric conductivity of the column selection element increases so as to be a switched-on state. Ultimately, a specific row line (for example, the i-th row in the row lines) among the M number of row lines is selected such that the high potential is applied to the row line (the i-th row in the row lines). This causes the row selection element connected to the selected row line (the i-th row in the row lines) to be the ON state.

Next, the selection signal is input to a specific column line (the j-th column in the column lines) among the N number of column lines in this condition, the electric conductivity of the column selection element connected to the selected column line (the j-th column in the column lines) increases so as to a transistor ON state. As a result, only the electrostatic capacitance detection element located at the intersection of the selected row (the i-th row) and the column (the j-th column), namely located at the i-th row, j-th column, is selected from among a group of the M×N number of electrostatic capacitance detection elements so as to change the electric conductivity between the output line and power supply line. Consequently, only the signal amplifying element located at the i-th row, j-th column plays a role of electrical conduction between the output line and power supply line.

Measuring the source-drain current Ids or the voltage determined by the source-drain current of the signal amplifying element located at the i-th row and j-th column with the measuring instrument connected to the output line, we can obtain the ridge and valley information of the surface of the target object. In other words, providing the column selection element in each electrostatic capacitance detection element we can uniquely select the column so as to prevent the information interference among columns. Likewise, providing the row selection element in each electrostatic capacitance detection element we can uniquely select the row so as to prevent the information interference among rows. Arranging the column selection element and row selection element in series prevents the information leaking from the output line to the power supply line so as to enable the electrostatic capacitance to be detected accurately. In order to achieve the results, the column selection element, the row selection element and the signal amplifying element are arranged in series regardless of the order.

What is the most important point is that those three elements are arranged in series between the power supply line and the output line, the gate electrode of the row selection element is connected to the row line, the gate electrode of the column selection element is connected to the column line, the gate electrode of the signal amplifying element is connected to the electrostatic capacitance detecting electrode. In this way, in this invention, when the electrostatic capacitance detection element is led to be the selected state by the row selection signal and the column selection signal, the drain electrode of the MIS thin-film semiconductor device for signal amplification is electrically connected to the output line, and the source electrode of that is electrically connected to the power supply line. In fact, a switching element, such as the row selection element, the column selection element or the like can be provided between the signal amplifying element and the output line, or between the signal amplifying element and the power supply line according to an order of the arrangement of three elements. Since these switching elements exhibit a high electric conductivity during the selected period, the drain electrode of the signal amplifying element is connected to the output line, and the source electrode of that is connected to the power supply line. As a result, the electric conductivity of the signal amplifying element itself can determine a current value flowing from the output line to the power supply line.

As described later, if a ridge of the target object (for example, ridges of a fingerprint) is in contact with the capacitance detection layer, the electric conductivity of the signal amplifying element is so small that few current flows from the output line to the power supply line. Conversely, if a valley of the target object (for example, valleys of a fingerprint) is present over the surface of the capacitance detecting dielectric layer such that a thin air layer is formed between the target object and the capacitance detecting dielectric layer, the electric conductivity of the signal amplifying element becomes so markedly large that the extremely large current flows from the output line to the power supply line. In this way, ridge and valley information of the surface of the target object is obtained by measuring the current (or the corresponding voltage) produced at the output line.

Since each electrostatic capacitance detection element can include the row selection element and the column selection element, this has an advantage that only one specific electrostatic capacitance detection element is selected without fail from among the group of the M×N number of electrostatic capacitance detection elements as described above. On the other hand, if no reference capacitor is provided, the transistor capacitance of the signal amplifying element and a capacitance of the target object are capacitively coupled, so that a product of its capacity ratio multiplied by a drain voltage of the signal amplifying element is applied to the gate electrode of the signal amplifying element. Since the row selection element, the column selection element and the signal amplifying element are arranged in series, a drain potential of the signal amplifying element drops from the high potential value ($V_{dd}$), which is applied to the output line or the power supply line, due to the presence of the row selection element and the column selection element.

For example, on the assumption that the electric conductivity of the row selection element, the column selection element and the signal amplifying element in the ON state are nearly same, if the $V_{dd}$ is applied to the output line, and the power supply line is grounded, the drain potential of the signal amplifying element is decreased to approximately $V_{dd}/3$. Because of this, even if the electrostatic capacitance of a subject to be measured changes, a changing amount of the gate potential of the signal amplifying element becomes small as $V_{dd}/3$ at a maximum. This causes a lowering of a detection accuracy or requires the $V_{dd}$ to be increased.

In order to solve the problem, the reference capacitor is employed in this invention such that one of the pair of electrodes in the reference capacitor is directly connected to the row line. Accordingly, the high potential ($V_{dd}$) is applied to one of the pair of electrodes in the reference capacitor without fail even though the row selection element and the column selection element are provided. Therefore, this enables the gate potential of the signal amplifying element to be approximately zero at a minimum and approximately $V_{dd}$ at a maximum. In other words, a configuration of the invention enables the gate potential of the signal amplifying element to be changed from at approximately a negative power supply potential ($V_{ss}$: zero volt) to at approximately a positive power supply potential ($V_{dd}$: high potential) in response to the electrostatic capacitance of the object to be measured, even if the row selection element, the column selection element and the signal amplifying element are connected in series between the output line and the power supply line. If the gate potential of the signal amplifying element is approximately the negative power supply potential, the MIS thin-film semiconductor device for signal amplification becomes the OFF state such that the electric conductivity of the signal amplifying element becomes extremely small. Conversely, if the gate potential of the signal amplifying element is approximately the positive power supply potential, the MIS thin-film semiconductor device for signal amplification becomes the ON state such that the electric conductivity of the signal amplifying element becomes extremely large. The ridge and valley information of the target object can be obtained by measuring such change of the electric conductivity via the output line.

In the above-mentioned configuration, the row selection element and the signal amplifying element must include the same conductivity type thin-film semiconductor device. This is because the row selection signal that is input to the row line is applied to the gate electrode of the row selection element, and simultaneously, the row selection signal is applied to the gate electrode of the signal amplifying element via the reference capacitor. Specifically, if the row selection element and the signal amplifying element are the N-type semiconductor device, the negative power supply potential (ground potential, zero volt) is applied to the row line during the unselected period, and the positive power supply potential (high potential, plus potential, for example, +2.5 V, +3.3 V or the like) is applied to the row line during the selected period. If the row selection element and the signal amplifying element are the P-type semiconductor device, the positive power supply potential (ground potential, zero volt) is applied to the row line during the unselected period, and the negative power supply potential (negative potential, minus potential, for example, minus 2.5 V, minus 3.3 V or the like) is applied to the row line during the selected period.

In addition, if the semiconductor device is used for the column selection element, it is preferred that the MIS thin-film semiconductor device for column selection is the conductivity type as the same as the row selection element and the signal amplifying element. In this way, the source and the drain region of the three thin-film semiconductor devices are all the same in conductivity. This can eliminate an unnecessary contact hole or the like so as to result in a smaller element. As a result, it enables an area of the capacitance detecting electrode to be large so as to increase a detection sensitivity.

For example, the row selection element, the column selection element and the signal amplifying element are all composed of the N-type semiconductor, the row line and the column line are kept at negative power supply potential (ground potential) during the unselected period, and the positive power supply potential (plus potential) is applied to the each line during the selected period. Alternatively, the row selection element, the column selection element and the signal amplifying element are all composed of the P-type semiconductor, the row line and the column line are kept at positive power supply potential (ground potential) during the unselected period, and the negative power supply potential (minus potential) is applied to the each line during the selected period.

The power supply line and the output line are adaptively arranged in a matrix of M rows and N columns. The output lines that are adaptively arranged in the electrostatic capacitance detection device can be connected in N number being the same number as that of the column lines in the column direction, and in M number being the same number as that of the row lines in the row direction. In addition, one output line per two columns (N/2 number) may be located or one output line per two rows (M/2 number) may be located. Likewise, the power supply lines that are adaptively arranged in the electrostatic capacitance detection device also can be connected in N number being the same number as that of the column lines in the column direction, and in M number being the same number as that of the row lines in the row direction. In addition, one power supply line per two columns (N/2 number) may be located or one power supply line per two rows (M/2 number) may be located.

In this invention, since the each electrostatic capacitance detection element is selected one-by-one, the output line and the power supply line include various configurations as above described. In an example in FIG. 3, the output lines are connected in N number being the same number as that of the column lines in the column direction and the power supply lines are connected in M number being the same as that of the row lines in the row direction. The power supply line is connected to either the negative power supply or the positive power supply.

A measuring instrument, which is an ammeter or a voltmeter, is connected at the end of the output line and outside of the matrix of M rows and N columns. The measuring instrument may be composed of the thin-film semiconductor devices or employ an outer circuit using IC. If the power supply line is connected to the negative power supply, the output line is connected to the positive power supply via the measuring instrument. In this case, if the signal amplifying element in the selected electrostatic capacitance detection element has a large electric conductivity, a current flows from the positive power supply to the power supply line, which is connected to the negative power supply, via the measuring instrument. If the signal amplifying element has a small electric conductivity, of course, no such current is generated. The measuring instrument obtains the convexo-concave information of the target object from a presence or absence of such current or a change of a potential corresponding to the current. Conversely, if the power supply line is connected to the positive power supply, the output line is connected to the negative power supply via the measuring instrument. If the signal amplifying element in the selected electrostatic capacitance detection element has a large electric conductivity, a current flows from the power supply line, which is connected to the positive power supply, to the negative power supply via the measuring instrument. If the signal amplifying element has a small electric conductivity, no such current is generated. While the current direction is the opposite from the above-mentioned example, the convexo-concave information of the target object can be obtained in a same principle.

In order for the MIS thin-film semiconductor device for signal amplification of the invention to effectively amplify a signal when the device has the aforementioned structure, the transistor capacitance $C_T$ of the MIS thin-film semiconductor device for signal amplification, a reference capacitor capacitance $C_R$ and the element capacitance $C_D$ of the signal detection element must be appropriately set. These will be explained next, with reference to FIG. 4 or FIG. 5.

First, a situation will be considered where the ridges of the object to be measured are in contact with the capacitance detecting dielectric layer, and the target object is electrically grounded. Specifically, a situation is assumed where the ridges of a fingerprint that is in contact with the surface of the electrostatic capacitance detection device are detected. The reference capacitor capacitance $C_R$ and the transistor capacitance $C_T$ of the MIS thin-film semiconductor device for signal amplification are defined by the equation:

$$C_R = \epsilon_0 \cdot \epsilon_R \cdot S_R / t_R$$

$$C_T = \epsilon_0 \cdot \epsilon_{ox} \cdot S_T / t_R$$

where $S_R$ (µm²) is the area of the reference capacitor electrode, $t_R$ is the thickness of reference capacitor dielectric layer, $\epsilon_R$ is a relative dielectric constant of the reference capacitor dielectric layer, $S_T$ (μm²) is the area of the gate electrode of the MIS thin-film semiconductor device for signal amplification, $t_{ox}$ (μm) is the thickness of the gate insulator, $\epsilon_{ox}$ is a relative dielectric constant of the gate insulator, and $\epsilon_0$ is the permittivity in vacuum. In addition, the element capacitance $C_D$ is defined by the equation:

$$C_D = \epsilon_0 \cdot \epsilon_D \cdot S_D / t_D$$

where $S_D$ is the area of the capacitance detecting electrode, $t_D$ is the thickness of the capacitance detecting dielectric layer, $\epsilon_D$ is a relative dielectric constant of the capacitance detecting dielectric layer, and $\epsilon_0$ is the permittivity in vacuum.

The surface of the target object serves as the earth electrode of the element capacitance $C_D$ and the capacitance detecting electrode corresponds to the other electrode. A capacitance detecting dielectric layer is interposed between the two electrodes. Since the capacitance detecting electrode is connected to the gate electrode of the MIS thin-film semiconductor device for signal amplification and the one of the pair of electrodes in the reference capacitor, the capacitor having the transistor capacitance $C_T$ and the capacitor having the element capacitance $C_D$ are connected in series, and the capacitor having the element capacitance $C_D$ is also connected to the capacitor having the capacitance $C_R$ in series. The other electrode of the electrodes of the reference capacitor, to which the voltage $V_{dd}$ is applied when the row line is selected, is connected to the row line.

Figure 4:
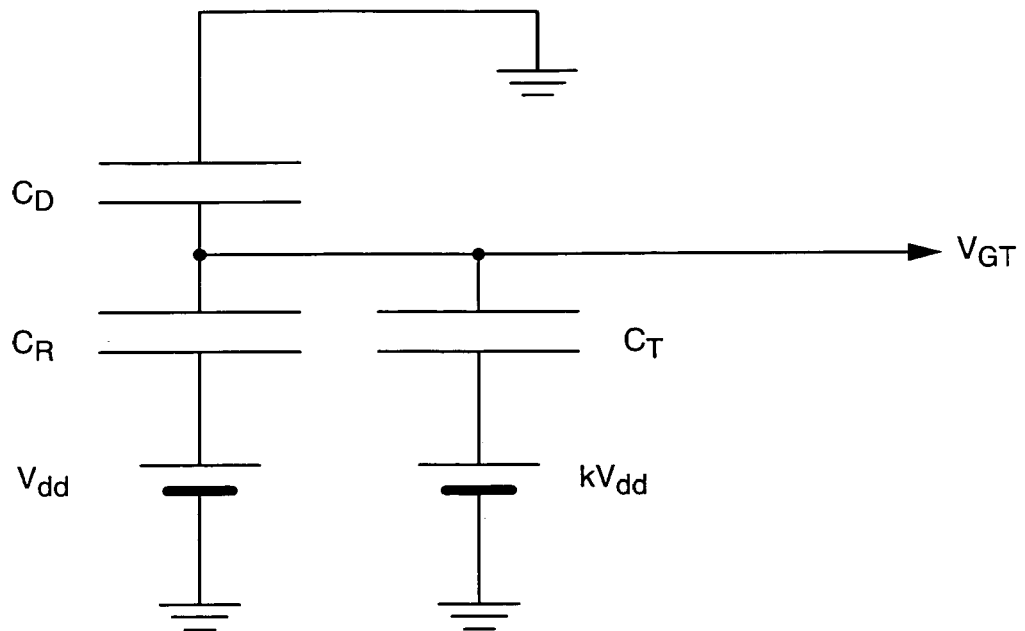
FIG. 4 is a diagram illustrating the principle of the invention.

Since the signal amplifying element, which is connected to the column selection element and the row selection element in series, is located between the power supply line and the output line, the drain potential of the MIS thin-film semiconductor device for signal amplification is k times ($0 < k \leq 1$) of a potential difference, $V_{dd}$, between the output line and the power supply line when the electrostatic capacitance detection element is selected (FIG. 4). A value of k is determined by a resistance value of the column selection element, the row selection element and the signal amplifying element. Specifically, it is greater than zero, and one and below. If no column selection element and row selection element are provided, the value of k is one. The voltage applied to the row line and the drain potential of the signal amplifying element are divided among the three capacitors in response to the electrostatic capacitance. Here, therefore, the voltage $V_{GT}$ (the gate voltage when the ridge is contacted), which is applied to the gate electrode of the MIS thin-film semiconductor device for signal amplification, is as shown in Equation 1.

$$V_{GT} = \frac{kC_T + C_R}{C_D + C_T + C_R} \cdot V_{dd} \quad \text{Equation 1}$$

Therefore, when the element capacitance $C_D$ is sufficiently larger than the sum of the reference capacitor capacitance $C_R$ and the transistor capacitance $C_T$, namely $C_R + C_T$, as shown in Equation 2, $$C_D >> C_T + C_R \quad \text{Equation 2}$$

the gate voltage $V_{GT}$ is approximated as shown in Equation 3, $$V_{GT} \approx 0 \quad \text{Equation 3}$$

in other words almost no voltage is applied to the gate electrode. As a result, the MIS thin-film semiconductor device for signal amplification is in the OFF state, and the current I is extremely small. Ultimately, the signal amplifying element should release almost no current when the ridge of a target object corresponding to the ridge of a fingerprint contacts the electrostatic capacitance detection device. Hence, in order to attain that, the gate electrode area (the gate electrode length, gate electrode width), gate insulator material, gate insulator thickness, reference capacitor electrode area (the capacitor electrode length, capacitor electrode width), reference capacitor dielectric layer material, reference capacitor dielectric layer thickness, capacitance detecting electrode area, capacitance detecting dielectric layer material, and capacitance detecting dielectric layer thickness that comprise the electrostatic capacitance detection element must be appropriately set so that the element capacitance $C_D$ is sufficiently larger than the sum of the reference capacitor capacitance $C_R$ and the transistor capacitance $C_T$, namely $C_R + C_T$. In general, sufficiently larger can mean a difference in magnitude of about 10 times or greater. In other words, the element capacitance $C_D$ and the sum of the reference capacitor capacitance $C_R$ and the transistor capacitance $C_T$ should satisfy the following relationship:

$$C_D > 10 \times (C_R + C_T)$$

In this case, $V_{GT}/V_{dd}$ is approximately 0.1 or less, and the thin-film semiconductor device cannot enter the ON state. For the ridges of a target object to be accurately detected, it is important that the MIS thin-film semiconductor device for signal amplification be in the OFF state when the ridges of the target object contact the electrostatic capacitance detection device. Therefore, if a positive power supply is used for the power supply voltage $V_{dd}$, an N-type enhancement mode transistor (normally off type), which does not release drain current at a gate voltage near zero, is preferably used as the MIS thin-film semiconductor device for signal amplification. More ideal is to use an N-type MIS thin-film semiconductor device for signal amplification in which the minimum gate voltage satisfies the relationship:

$$0 < 0.1 \times V_{dd} < V_{min}$$

or $$0 < V_{GT} < V_{min}$$

where the minimum gate voltage, $V_{min}$, is defined as the gate voltage at which the minimum drain current in transfer characteristics is reached. Conversely, if the negative power supply is used for the power supply voltage $V_{dd}$, a P-type enhancement mode transistor (normally off type), which does not release drain current at a gate voltage near zero, is used as the MIS thin-film semiconductor device for signal amplification. More ideal is to use a P-type MIS thin-film semiconductor device for signal amplification in which the minimum gate voltage $V_{min}$ of the P-type MIS thin-film semiconductor device for signal amplification satisfies the relationship:

$$V_{min} < 0.1 \times V_{dd} < 0$$

or $$V_{min} < V_{GT} < 0$$

This relationship enables the ridges of the target object to be accurately detected under the situation where the current value I is extremely small.

Next, a situation is considered where the target object is not in contact with but is separated from the capacitance detecting dielectric layer by a target object distance $t_A$. In other words, the valleys of the target object to be measured are above the capacitance detecting dielectric layer and, moreover, the target object is electrically grounded. Specifically imagined is the detection of a valley in a fingerprint that is present over the surface of the electrostatic capacitance detection device when the electrostatic capacitance detection device is used as a fingerprint sensor.

As stated above, in the electrostatic capacitance detection device of the present invention, the capacitance detecting dielectric layer is preferably located on the uppermost surface of the electrostatic capacitance detection device. An equivalent circuit diagram in this case is shown in FIG. 5. Since the surface of the target object is not in contact with the capacitance detecting dielectric layer, a new capacitor with air as the dielectric is formed between the capacitance detecting dielectric layer and the target object surface. This is called a target object capacitance $C_A$ and is defined as follows:

$$C_A = \epsilon_0 \cdot \epsilon_A \cdot S_D / t_A$$

where $\epsilon_0$ is the permittivity in vacuum, $\epsilon_A$ is the dielectric constant of air, and $S_D$ is the area of the capacitance detecting electrode. When such a target object is separated from the capacitance detecting dielectric layer, the element capacitance $C_D$ and the target object capacitance $C_A$ are connected in series, and these capacitors are connected to the transistor capacitance $C_T$ and the reference capacitor capacitance $C_R$, both of which are connected in parallel each other, in series. The voltage $V_{dd}$ is applied to the reference capacitor. The voltage of $kV_{dd}$ is applied to the drain electrode of the signal amplifying element (FIG. 5).

The applied voltage is divided among the four capacitors in response to the electrostatic capacitance. Here, therefore, voltage $V_{GV}$, (the gate voltage when the valley is present), which is applied to the gate electrode of the MIS thin-film semiconductor device for signal amplification, is as shown in Equation 4.

$$V_{GV} = \frac{kC_T + C_R}{\frac{C_A C_D}{C_A + C_D} + C_T + C_R} \cdot V_{dd} \qquad \text{Equation 4}$$

In this invention, the electrostatic capacitance detection element is formed such that the condition in Equation 2 is satisfied.

$$C_D \gg C_T + C_R \qquad \text{Equation 2}$$

This is done so that the drain current is extremely small when the target object contacts the electrostatic capacitance detection device. Therefore, $V_{GV}$ is approximated by Equation 5.

$$V_{GV} \approx \frac{V_{dd}}{\frac{C_T + C_R}{kC_T + C_R} + \frac{C_A}{kC_T + C_R}} \qquad \text{Equation 5}$$

Here, if the transistor capacitance $C_T$ is sufficiently larger than the target object capacitance $C_A$ as in Equation 6, $$C_R \gg C_A \qquad \text{Equation 6}$$

then the gate voltage $V_{GV}$ is expressed by Equation 7 to be further simplified, $$V_{GV} \approx \frac{kC_T + C_R}{C_T + C_R} \cdot V_{dd} \qquad \text{Equation 7}$$

If the value of k is nearly one, the gate voltage $V_{GV}$ is nearly equal to the power supply voltage $V_{dd}$. If the reference capacitor capacitance $C_R$ is sufficiently larger than the transistor capacitance $C_T$ as in Equation 8, $$C_R \gg C_T \qquad \text{Equation 8}$$

then the gate voltage $V_{GV}$ is expressed by Equation 9 regardless of the number of k, $$V_{GV} \approx V_{dd} \qquad \text{Equation 9}$$

and nearly equal to the power supply voltage $V_{dd}$. As a result, the MIS thin-film semiconductor device for signal amplification can be put into the ON state and an extremely large current I is obtained. In order for the signal amplifying element to conduct a large current when a valley of a target object corresponding to the valley of a fingerprint is present over the electrostatic capacitance detection device, the signal amplifying element must be appropriately set so that the reference capacitor capacitance $C_R$ is sufficiently larger than the target object capacitance $C_A$.

As stated above, since a difference in magnitude of about 10 times is generally considered sufficiently larger, the reference capacitor capacitance $C_R$ and the target object capacitance $C_A$ should satisfy the following relationship:

$$C_R > 10 \times C_A$$

In addition, in order to cause the transistor enter ON state when the valley of the finger-print or the like approaches regardless of the value of k, the reference capacitor capacitance $C_R$ may be sufficiently larger than the transistor capacitance $C_T$ as following relationship:

$$C_R > 10 \times C_T$$

If those conditions are satisfied, the $V_{GT}/V_{dd}$ is approximately 0.9 or greater, and the thin-film semiconductor device easily enters the ON state. In order for a valley of a target object to be accurately detected, it is important that the MIS thin-film semiconductor device for signal amplification be in the ON state when the valley of the target object approaches the electrostatic capacitance detection device. If a positive power supply is used for the power supply voltage $V_{dd}$, an N-type enhancement mode transistor (normally off type) is used as the MIS thin-film semiconductor device for signal amplification. The threshold voltage $V_{th}$ of this transistor is preferably smaller than the $V_{GV}$. More ideal is to use an N-type MIS thin-film semiconductor device for signal amplification that satisfies the following relationship:

$$0 < V_{th} < 0.91 \times V_{dd}$$

Conversely, if a negative power supply is used for the power supply voltage $V_{dd}$, a P-type enhancement mode transistor (normally off type) is used as the MIS thin-film semiconductor device for signal amplification. Ideally, the threshold voltage $V_{th}$ of the signal-amplifying P-type MIS thin-film semiconductor device is preferably larger than the $V_{GV}$. More ideal is to use a signal-amplifying P-type MIS thin-film semiconductor device that satisfies the following relationship:

$$0.91 \times V_{dd} < V_{th} < 0$$

This relationship enables the valleys of the target object to be accurately detected under the situation where the current value I is extremely large.

Ultimately, correct recognition of the ridges and valleys in the target object requires that the signal amplifying element conducts almost no current when a ridge of the target object, which corresponds to a ridge in an object, such as a fingerprint, contacts the electrostatic capacitance detection device. At the same time, correct recognition of the ridges and valleys in the target object requires that the signal amplifying element conducts a large current when a valley in the target object, which corresponds to a valley in an object such as a fingerprint, is over the electrostatic capacitance detection device. Therefore, to achieve correct recognition of the ridges and valleys, the capacitance detecting dielectric layer in the electrostatic capacitance detection element must be positioned on the uppermost surface of the electrostatic capacitance detection device.

Moreover, the gate electrode area $S_T$ ($\mu m^2$), the thickness $t_{ox}$ ($\mu m$) of the gate insulator and the relative dielectric constant $\in_{ox}$ of the gate insulator of the MIS thin-film semiconductor device for signal amplification, the reference capacitor electrode area $S_R$ ($\mu m^2$), the thickness $t_R$ ($\mu m$) of the reference capacitor dielectric layer, the relative dielectric constant $\in_R$ of the reference capacitor dielectric layer, the capacitance detecting electrode area $S_D$ ($\mu m^2$), the thickness $t_D$ ($\mu m$) of the capacitance detecting dielectric layer and the relative dielectric constant $\in_D$ or the like must all be appropriately set so that the element capacitance $C_D$ is sufficiently larger than the sum of the reference capacitor capacitance $C_R$ and the transistor capacitance $C_T$, namely $C_R + C_T$. Also, it is required that the electrostatic capacitance detection device be configured so that the reference capacitor capacitance $C_R$ is sufficiently larger than the target object capacitance $C_A$ when the target object is not in contact with the capacitance detecting dielectric layer but is separated by the target object distance $t_A$. Further still, it is ideal that the reference capacitor capacitance $C_R$ is sufficiently larger than the transistor capacitance $C_T$. More specifically, the electrostatic capacitance detection device is provided such that the reference capacitor capacitance $C_R$, and the transistor capacitance $C_T$ satisfy the following relationship:

$$C_R > 10 \times C_T$$

and the element capacitance $C_D$, the reference capacitor capacitance $C_R$ and the target capacitance $C_A$ satisfy the following relationship:

$$C_D > 10 \times C_R$$

$$C_R > 10 \times C_A$$

In addition, if a positive power supply is used for the power supply voltage $V_{dd}$, an N-type enhancement mode transistor (normally off type) is preferably used as the MIS thin-film semiconductor device for signal amplification. It is ideal to use an N-type enhancement mode transistor wherein the minimum gate voltage $V_{min}$ satisfies the following relationship:

$$0 < 0.1 \times V_{dd} < V_{min} \text{ or } 0 < V_{GT} < V_{min}$$

and, moreover, wherein the threshold voltage $V_{th}$ is smaller than the $V_{GV}$, and, specifically, satisfies the following relationship:

$$0 < V_{th} < 0.91 \times V_{dd} \text{ or } 0 < V_{th} < V_{GV}$$

Conversely, if a negative power supply is used for the power supply voltage $V_{dd}$, a P-type enhancement mode transistor (normally off type) is preferably used as the MIS thin-film semiconductor device for signal amplification. It is ideal to use a P-type enhancement mode transistor wherein the minimum gate voltage $V_{min}$ satisfies the following relationship:

$$V_{min} < 0.1 \times V_{dd} < 0 \text{ or } V_{min} < V_{GT} < 0$$

and, moreover, wherein the threshold voltage $V_{th}$ is larger than the $V_{GV}$, and, specifically, satisfies the following relationship:

$$0.91 \times V_{dd} < V_{th} < 0 \text{ or } V_{GV} < V_{th} < 0$$

Figure 6:
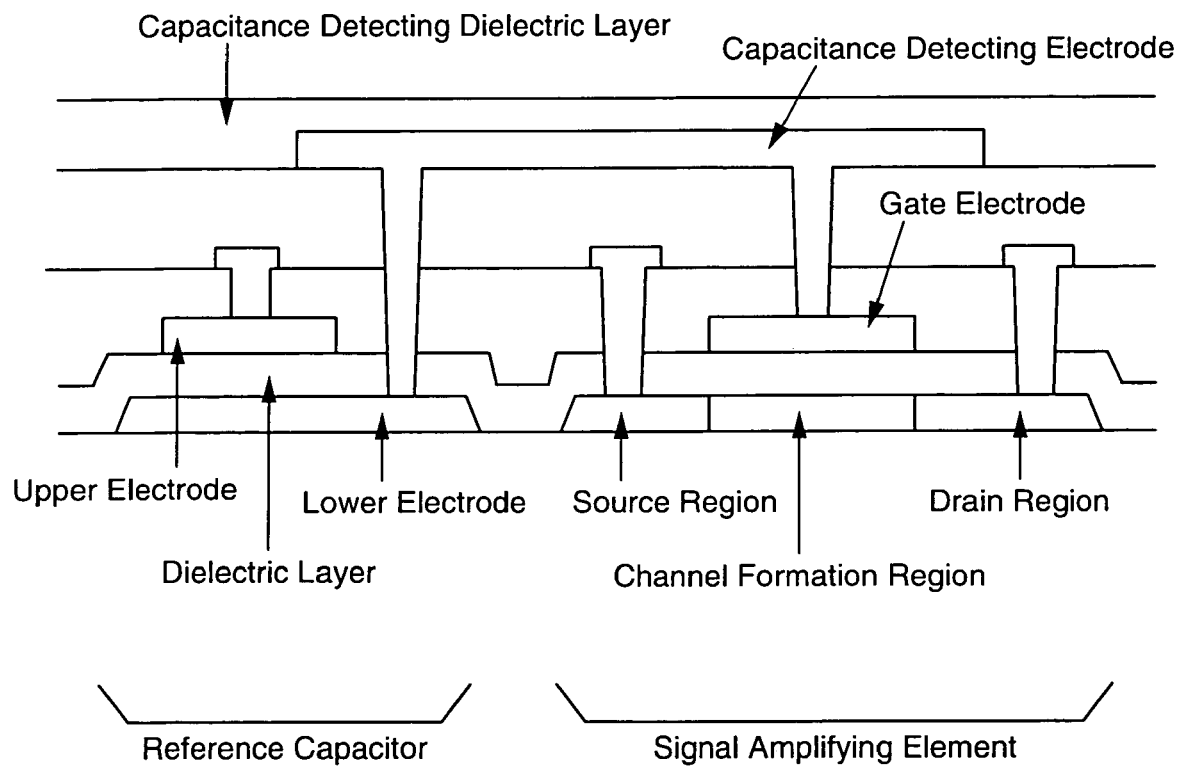
FIG. 6 is a diagram illustrating the element structure of the invention.

Next, an exemplary structure of the electrostatic capacitance detection element that embodies this invention will be explained with reference to FIG. 6. In this invention, since the row selection element, the column selection element and the signal amplifying element have the same structure excluding the conductivity type and the impurity concentration in the source and the drain region, a cross-sectional structure of the signal amplifying element and the reference capacitor are shown in FIG. 6. In the MIS thin-film semiconductor device for signal amplification comprising the signal amplifying element of the electrostatic capacitance detection element, essential structures are a gate insulator, a gate electrode, and a semiconductor layer that includes a source region, a channel formation region, and a drain region. Also, in the MIS thin-film semiconductor device for row selection element comprising the row selection element and in the MIS thin-film semiconductor device for column selection element comprising the column selection element, essential structures are a gate insulator, a gate electrode, and a semiconductor layer that includes a source region, a channel formation region, and a drain region.

In a structure example in FIG. 6, the MIS thin-film semiconductor device for signal amplification is composed of NMOS and a lower electrode of the reference capacitor is composed of the N-type semiconductor layer that is the same material of the drain region of the MIS thin-film semiconductor device for signal amplification. Both the lower electrode of the reference capacitor and the drain region of the MIS thin-film semiconductor device for signal amplification are formed on the same base protection layer.

The dielectric layer of the reference capacitor is made of the silicon oxide layer that is the same material of the gate insulator of the MIS thin-film semiconductor device for signal amplification and both layers are formed on the same layer (on the semiconductor layer). An upper electrode of the reference capacitor is formed by a metal layer (specifically, tantalum thin film) that is the same material of the gate electrode of the MIS thin-film semiconductor device for signal amplification, and is formed on the silicon oxide layer comprising the gate insulator and the reference capacitor dielectric layer. While the lower electrode of the reference capacitor is connected to the capacitance detecting electrode and the gate electrode of the signal amplifying element in FIG. 6, of course, the upper electrode of the reference capacitor may be connected to the capacitance detection electrode and the gate electrode of the signal amplifying element.

Such an electrostatic capacitance detection element can be formed on a plastic substrate using the aforementioned SUFTLA technology. On plastic, a fingerprint sensor based on single-crystal silicon technology would promptly break or would have very little practical application, since it would not possess sufficient size. In contrast to this, an electrostatic capacitance detection element formed on a plastic substrate according to the present invention will not break even if the area on the plastic substrate is sufficiently large to cover a fingertip. Hence, the present invention can be used as a fingerprint sensor on a plastic substrate. Specifically, the present invention enables the realization of a smart card equipped with a personal identification function. Used in cash cards (bank cards), credit cards, identify cards, and so forth, smart cards equipped with a personal identification function have the superior feature of not only markedly improving the security level of these cards but also of protecting personal fingerprint information from being released outside the card.

An electrostatic capacitance detection device made up of thin-film semiconductor devices was fabricated on a glass substrate. The fabricated electrostatic capacitance detection device was then transferred to a plastic substrate using the SUFTLA technology. An electrostatic capacitance detection device was thus produced on a plastic substrate. The electrostatic capacitance detection device includes electrostatic capacitance detection elements aligned in a matrix of 304 rows and 304 columns. The array is 20 mm square.

The substrate, made of poly-ether-sulfone (PES), has a thickness of 200 μm. The N-type MIS thin-film semiconductor device for signal amplification, the N-type MIS thin-film semiconductor device for column selection, and the-N type MIS thin-film semiconductor device for row selection are all fabricated with thin-film transistors having the same cross-sectional structure. The thin-film transistors are a top-gate type, as shown in FIG. 6. They are fabricated in a low-temperature process where the maximum process temperature is 425 degrees centigrade. The semiconductor layer, a polycrystalline silicon thin-film achieved through laser crystallization, has a thickness of 50 nm. In addition, the gate insulator is a silicon-oxide layer having a thickness of 45 nm that was formed by chemical vapor deposition (CVD). The gate electrode includes a 400-nm-thick tantalum thin-film. The dielectric constant of the silicon-oxide film that forms the gate insulator was found to be approximately 3.9 according to CV measurement. The lower electrode of the reference capacitor is formed by the N-type semiconductor layer that is the same of the drain region of the N-type MIS thin-film semiconductor device for signal amplification. The reference capacitor dielectric layer is made of the silicon oxide layer that is the same of the gate insulator of the N-type MIS thin-film semiconductor device for signal amplification.

The upper electrode of the reference capacitor includes the tantalum thin-film that is the same as the gate electrode of the N-type MIS thin-film semiconductor device for signal amplification. The lower electrode of the reference capacitor is connected to the row line via a contact hole. The upper electrode of the reference capacitor is connected to the capacitance detecting electrode and the gate electrode of the N-type MIS thin-film semiconductor device for signal amplification.

The circuit configuration of the electrostatic capacitance detection element is the same as shown in FIG. 3. The negative power supply (ground potential) was connected to the power supply line wired in the electrostatic capacitance detection element. The positive power supply ($V_{dd}$=+3.3 V) was connected to the end of the output line. The measuring instrument is a comparator composed of the thin-film semiconductor device. The column line and the row line were maintained at the ground potential during the unselected period, and the positive power supply potential ($V_{dd}$=+3.3 V) was applied to them during the selected period.

In this exemplary embodiment, the pitch of the rows and columns that form the electrostatic capacitance detection device is 66 μm, and the resolution is 385 dpi (dots per inch). Therefore, the area of the capacitance detecting electrode was 1485 μm$^2$. The capacitance detecting dielectric layer was formed by a silicon-nitride layer having a thickness of 300 nm. Since CV measurement showed the dielectric constant of the silicon-nitride layer to be approximately 7.5, the element capacitance $C_D$ is approximately 329 fF (femtofarad).

Assuming that the electrostatic capacitance detection device of this exemplary embodiment is a fingerprint sensor, since the difference in height between the ridges and valleys in a fingerprint is approximately 50 μm, the target object capacitance $C_A$ when a valley in a fingerprint is present over the surface of the electrostatic capacitance detection device is calculated to be 0.26 fF. On the other hand, because the gate electrode length L of the MIS thin-film semiconductor device for signal amplification was set to 2 μm, and the gate electrode width W was set to 2 μm, the transistor capacitance $C_T$ is approximately 3.07 fF. In addition, the area $S_R$ of the reference capacitor electrode was 42 μm$^2$. As a result, the reference capacitor capacitance $C_R$ was 32 fF. Thus, the electrostatic capacitance detection element described in this embodiment satisfies the following relationship:

$$C_D > 10 \times C_R$$

$$C_R > 10 \times C_T$$

$$C_R > 10 \times C_A$$

Thus, if the power supply voltage $V_{dd}$ is 3.3V, then 0.30V is the voltage $V_{GT}$ applied to a gate electrode of an MIS thin-film semiconductor device for signal amplification when ridges in a fingerprint touch the surface of the electrostatic capacitance detection device; and 3.08V is the voltage $V_{GV}$ applied to this gate electrode when a valley in a fingerprint is present. The minimum gate voltage Vmin of the N-type MIS thin-film semiconductor device for signal amplification of the embodiment is 0.35V. Since it is larger than the gate voltage $V_{GT}$ of 0.30V when a ridge in a fingerprint touches the surface of the electrostatic capacitance detection device, the N-type MIS thin-film semiconductor device for signal amplification completely entered the OFF state. On the other hand, the threshold voltage $V_{th}$ is 1.42V. Since it is smaller than the gate voltage $V_{GV}$ of 3.11V when a valley in a fingerprint is present, the N-type MIS thin-film semiconductor device for signal amplification completely entered the ON state. As a result, the current value that is output from a signal amplifying element when a ridge in a fingerprint touches the surface of the electrostatic capacitance detection device is, at 4.5×10$^{-13}$ A, exceedingly small. Conversely, when a valley in a fingerprint is present, a large current of 2.5×10$^{-5}$ A is output from the signal amplifying element. Hence ridge and valley information for objects such as fingerprints was detected with high accuracy and precision.

As described in detail above, with the technology of the related art, which uses a single-crystal silicon wafer, only small electrostatic capacitance detection devices measuring approximately several millimeters by several millimeters can be formed on a plastic substrate. According to the invention, however, an electrostatic capacitance detection device having an area some 100 times larger can be formed on a plastic substrate, and, moreover, is capable of extremely high-accuracy detection of ridge and valley information in a target object. The invention can be used, for example, to markedly improve the security level of a smart card. In addition, a related electrostatic capacitance detection device formed on a single-crystal silicon wafer wastes a tremendous amount of energy and labor, because only an extremely small portion of the device area actually uses the single-crystal silicon semiconductor. In contrast to this, the invention eliminates this kind of extravagant waste and has the effect of helping conserve the global environment.

What is claimed is:

1. An electrostatic capacitance detection device that reads surface contours of a target object by detecting electrostatic capacitance, which changes according to a distance from the target object, comprising:
   output lines;
   power supply lines;
   M number of row lines, and N number of column lines that are arranged in a matrix of M rows and N columns; and
   an electrostatic capacitance detection element that is formed at intersections between the row lines and column lines;
   the electrostatic capacitance detection element including a signal detection element, a signal amplifying element, a column selection element and a row selection element;
   the signal detection element including a capacitance detecting electrode, a capacitance detecting dielectric layer and a reference capacitor;
   the reference capacitor including a reference capacitor first electrode, a reference capacitor dielectric layer and a reference capacitor second electrode;
   the signal amplifying element, the column selection element and the row selection element being coupled in series and located between an output line and a power supply line; and
   the reference capacitor first electrode being electrically coupled to one of the row lines.

2. The electrostatic capacitance detection device according to claim 1, the capacitance detecting electrode being electrically coupled to the reference capacitor second electrode.

3. The electrostatic capacitance detection device according to claim 1, the signal amplifying element including an MIS thin-film semiconductor device for signal amplification, including a gate electrode, a gate insulator and a semiconductor layer, and the gate electrode of the signal amplifying element being electrically coupled to the capacitance detecting electrode and the reference capacitor second electrode.

4. The electrostatic capacitance detection device according to claim 1, the column selection element including an MIS thin-film semiconductor device for column selection, including the gate electrode, the gate insulator, and the semiconductor layer, and the gate electrode of the column selection element being electrically coupled to one of the column lines.

5. The electrostatic capacitance detection device according to claim 1, the row selection element including an MIS thin-film semiconductor device for row selection, including the gate electrode, the gate insulator, and the semiconductor layer, and the gate electrode of the row selection element being electrically coupled to the row line.

6. The electrostatic capacitance detection device according to claim 1, the signal amplifying element and the row selection element being a thin film semiconductor device having a same conductivity type.

7. The electrostatic capacitance detection device according to claim 1, the power supply lines being coupled to a negative power supply.

8. The electrostatic capacitance detection device according to claim 7, the output lines being coupled to a positive power supply via a measuring instrument.

9. The electrostatic capacitance detection device according to claim 1, the power supply lines being coupled to a positive power supply.

10. The electrostatic capacitance detection device according to claim 9, the output lines being coupled to a negative power supply via the measuring instrument.

11. The electrostatic capacitance detection device according to claim 6, the column selection element being an N-type thin-film semiconductor device, and the column line being kept at a negative power supply potential during an unselected period and a positive power supply potential being applied thereto during a selected period.

12. The electrostatic capacitance detection device according to claim 11, the row selection element being the N-type thin-film semiconductor device, and the row line being kept at the negative power supply potential during the unselected period and the positive power supply potential being applied thereto during the selected period.

13. The electrostatic capacitance detection device according to claim 6, the column selection element being a P-type thin-film semiconductor device, and the column line being kept at a positive power supply potential during an unselected period and a negative power supply potential being applied thereto in a selected state.

14. The electrostatic capacitance detection device according to claim 13, the row selection element being the P-type thin-film semiconductor device, and the row line being kept at the positive power supply potential during the unselected period and the negative power supply potential being applied thereto during the selected period.

15. The electrostatic capacitance detection device according to claim 1, the reference capacitor dielectric layer and the gate insulator of the MIS thin-film semiconductor device for signal amplification being formed with a same material on a same layer.

16. The electrostatic capacitance detection device according to claim 1, the reference capacitor first electrode and a drain region of the MIS thin-film semiconductor device for signal amplification being formed with a same material on a same layer.

17. The electrostatic capacitance detection device according to claim 1, the reference capacitor second electrode and the gate electrode of the MIS thin-film semiconductor device for signal amplification being formed with a same material on a same layer.

18. The electrostatic capacitance detection device according to claim 1, an element capacitance $C_D$ being sufficiently larger than a sum of a reference capacitor capacitance $C_R$ and a transistor capacitance $C_T$,
   when the reference capacitor capacitance $C_R$ and the transistor capacitance $C_T$ are defined by the equation:

$$C_R = \epsilon_0 \cdot \epsilon_R \cdot S_R / t_R$$

$$C_T = \epsilon_0 \cdot \epsilon_{ox} \cdot S_T / t_{ox}$$

where $S_R$ (μm²) is an area of the reference capacitor electrode, $t_R$ (μm) is a thickness of the reference capacitor dielectric layer, $\in_R$ is a relative dielectric constant of the reference capacitor dielectric layer, $S_T$ (μm²) is an area of gate electrode of the MIS thin-film semiconductor device, $t_{ox}$ (μm) is a thickness of the gate insulator, $\in_{ox}$ is the relative dielectric constant of the gate insulator and $\in_0$ is a permittivity in vacuum; and when an element capacitance $C_D$ of the signal detection element is defined by the equation:

$$C_D = \in_0 \cdot \in_D \cdot S_D / t_D$$

where $S_D$ (μm²) is an area of the capacitance detecting electrode, $t_D$ (μm) is a thickness of the capacitance detecting dielectric layer, $\in_D$ is a relative dielectric constant of the capacitance detecting dielectric layer and $\in_0$ is the permittivity in vacuum.

19. The electrostatic capacitance detection device according to claim 18, the capacitance detecting dielectric layer being located on an uppermost surface of the electrostatic capacitance detection device.

20. The electrostatic capacitance detection device according to claim 1, the target object being not in contact with, but is separated from, the capacitance detecting dielectric layer by a target object distance $t_A$ and the reference capacitor capacitance $C_R$ is sufficiently larger than a target object capacitance $C_A$, when the target object capacitance $C_A$ is defined by the equation:

$$C_A = \in_0 \cdot \in_A \cdot S_D / t_A$$

where $\in_0$ is the permittivity in vacuum, $\in_A$ is a relative dielectric constant of air, and $S_D$ is the area of the capacitance detecting electrode.

21. The electrostatic capacitance detection device according to claim 1, the capacitance detecting dielectric layer being located on an uppermost surface of the electrostatic capacitance detection device;

the element capacitance $C_D$ being sufficiently larger than a sum of a reference capacitor capacitance $C_R$ and a transistor capacitance $C_T$, when the reference capacitor capacitance $C_R$ and the transistor capacitance $C_T$ are defined by the equation:

$$C_R = \in_0 \cdot \in_R \cdot S_R / t_R$$

$$C_T = \in_0 \cdot \in_{ox} \cdot S_T / t_{ox}$$

where $S_R$ (μm²) is an area of the reference capacitor electrode, $t_R$ (μm) is a thickness of the reference capacitor dielectric layer, $\in_R$ is a relative dielectric constant of the reference capacitor dielectric layer, $S_T$ (μm²) is an area of the gate electrode of the MIS thin-film semiconductor device, $t_{ox}$ (μm) is a thickness of the gate insulator, $\in_{ox}$ is a relative dielectric constant of the gate insulator and $\in_0$ is a permittivity in vacuum, and when the element capacitance $C_D$ of the signal detection element is defined by the equation:

$$C_D = \in_0 \cdot \in_D \cdot S_D / t_D$$

where $S_D$ (μm²) is an area of the capacitance detecting electrode, $t_D$ (μm) is a thickness of the capacitance detecting dielectric layer, $\in_D$ is a relative dielectric constant of the capacitance detecting dielectric layer and $\in_0$ is the permittivity in vacuum; and the reference capacitor capacitance $C_R$ is sufficiently larger than the target object capacitance $C_A$, when the target object capacitance $C_A$ is defined by the equation:

$$C_A = \in_0 \cdot \in_A \cdot S_D / t_A$$

where $\in_0$ is the permittivity in vacuum, $\in_A$ is a relative dielectric constant of air, and $S_D$ is the area of the capacitance detecting electrode.

* * * * *